(12) United States Patent  (10) Patent No.: US 8,018,182 B2
Roehm et al.  (45) Date of Patent: Sep. 13, 2011

(54) METHOD AND DEVICE FOR AN OVERLOAD DETECTION IN HAND-GUIDED POWER TOOLS

(75) Inventors: Heiko Roehm, Stuttgart (DE); Wolfgang Hirschburger, Suffolk (GB)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 11/912,676

(22) PCT Filed: Jul. 17, 2006

(86) PCT No.: PCT/EP2006/064319
§ 371 (c)(1),
(2), (4) Date: Oct. 26, 2007

(87) PCT Pub. No.: WO2007/020146
PCT Pub. Date: Feb. 22, 2007

(65) Prior Publication Data
US 2008/0170340 A1  Jul. 17, 2008

(30) Foreign Application Priority Data
Aug. 12, 2005  (DE) .......................... 10 2005 038 225

(51) Int. Cl.
*H02P 1/00*  (2006.01)
(52) U.S. Cl. ......... 318/139; 318/374; 318/375; 318/756
(58) Field of Classification Search .................. 318/139, 318/374, 375, 756
See application file for complete search history.

(56) References Cited

U.S. PATENT DOCUMENTS

| | | | | |
|---|---|---|---|---|
| 4,249,117 A * | 2/1981 | Leukhardt et al. | ............ | 318/275 |
| 4,307,325 A * | 12/1981 | Saar | ............... | 388/809 |
| 4,550,277 A * | 10/1985 | Carney | ........... | 388/809 |
| 5,373,205 A * | 12/1994 | Busick et al. | ................. | 327/378 |
| 5,635,806 A * | 6/1997 | Wissmach et al. | ........... | 318/245 |
| 6,172,860 B1 | 1/2001 | Yoshimizu et al. | | |
| 6,424,799 B1 * | 7/2002 | Gilmore | ........................ | 388/811 |
| 6,696,814 B2 * | 2/2004 | Henderson et al. | ........... | 318/811 |
| 6,741,051 B2 * | 5/2004 | Chu | ................ | 318/376 |
| 2004/0041531 A1 | 3/2004 | Chu | | |
| 2005/0073282 A1* | 4/2005 | Carrier et al. | ................. | 320/106 |
| 2006/0209480 A1 | 9/2006 | Fritsch et al. | | |

FOREIGN PATENT DOCUMENTS

| | | |
|---|---|---|
| CN | 1485976 | 3/2004 |
| EP | 1 496 589 | 1/2005 |
| GB | 2 101 430 | 1/1983 |
| JP | 11-101836 | 4/1999 |
| WO | 2005/008857 | 1/2005 |

* cited by examiner

*Primary Examiner* — Walter Benson
*Assistant Examiner* — David S Luo
(74) *Attorney, Agent, or Firm* — Michael J. Striker

(57) ABSTRACT

The invention relates to a method for detecting an overload in an electric hand tool (10) comprising an electric motor (12), in particular a battery-driven electric hand tool (10). According to the invention, an operating current ($i_B$) of the electric motor (12) is determined, the difference ($I_D$) between the value of the operating current ($I_B$) and at least one stored current value ($I_G$) is determined and a thermal overload of the electric hand tool (10) is deduced from said difference ($I_D$). The invention also relates to a corresponding monitoring device (22).

23 Claims, 1 Drawing Sheet

METHOD AND DEVICE FOR AN OVERLOAD DETECTION IN HAND-GUIDED POWER TOOLS

CROSS-REFERENCE TO RELATED APPLICATIONS

The invention described and claimed hereinbelow is also described in German Patent Application DE 10 2005 038 225.8 filed on Aug. 12, 2005. This German Patent Application, whose subject matter is incorporated here by reference, provides the basis for a claim of priority of invention under 35 U.S.C. 119(a)-(d).

BACKGROUND OF THE INVENTION

The invention relates to a method for detecting an overload situation in a hand-guided power tool equipped with an electric motor, and to a corresponding device.

Methods for detecting an overload situation in a hand-guided power tool equipped with an electric motor are known from the prior art. The term "hand-guided power tool" is understood to mean, for example, screwdrivers, drill/drivers, circular saws, jigsaws, power planers, rotary hammers, or impact drills. In addition to hand-guided power tools that are driven by line current, there are also hand-guided power tools powered by rechargeable battery packs on the market. The aspects discussed below are intentionally focused primarily on hand-guided power tools powered by rechargeable battery packs, but the explanations naturally also apply to hand-guided power tools powered by line current. In power tools, situations can arise in which so much strain is placed on the motor that it comes to a standstill. When at a standstill, though, the electric motor continues to present only a very low ohmic resistance in relation to the energy source, resulting in very powerful flows of current. A motor at a standstill acts on a rechargeable battery pack in a fashion similar to a short circuit. It should also be noted that when the motor is at a standstill, the cooling is no longer available, i.e. the least amount of cooling is provided precisely when the most powerful flows of current are occurring. If there is no reaction to this state, for example by switching off the power, this can lead within seconds to a thermal failure of one or more components of the hand-guided power tool, for example a connecting line, the electric motor, or solder connections. Such a failure can also occur when the jamming occurs several times in succession without sufficient cool-down phases being observed between them. Typically in battery-powered hand-guided power tools, the thermal durability is increased through the use of high-temperature-resistant, low-ohm components, but this only delays the time at which the thermal failure eventually occurs. Alternatively, an analogous electrical switching-off can be used, which electrically interrupts the circuit when the current reaches a certain level. The components required for this, however, are expensive and can hamper the performance of the hand-guided power tool. The presetting of fixed current limits, however, also triggers a switching-off of the hand-guided power tool with the occurrence of temporary power surges, even though the tool would have been able to withstand them. Finally, there are known designs in which an NTC resistor measures the temperature of one or more critical components, for example the rechargeable battery pack, and when a predetermined maximum temperature is reached, the circuit is electrically interrupted. The disadvantage of this method, however, is that due to a low thermal conductivity or a volumetric expansion of the critical components, there can be a delay between the reaching of a critical temperature and the detection of this critical temperature.

SUMMARY OF THE INVENTION

In a method for detecting an overload situation in a hand-guided power tool equipped with an electric motor, in particular for a battery-powered hand-guided power tool, in which an operating current of the electric motor is determined, according to the present invention, a difference between the value of the operating current and at least one stored current value is determined and based on this difference, a conclusion is drawn as to whether a thermal overloading of the power tool is occurring. It should first be noted that the expression "a thermal overloading of the power tool" does not refer to an overloading of the tool as a whole, but rather a thermal overloading of one or more critical components of the tool, which experience has shown to be at risk of a thermal failure or which are known to be so. The critical components affected by the thermal overload particularly include a rechargeable battery pack, an accumulator cell, a switch, or the electric motor. One goal, therefore, is to detect an overload situation before a critical component is thermally damaged or becomes defective due to thermal failure. In accordance with the operating current $I_B$ and of the stored current value $I_G$, the difference that constitutes the basis for determining the thermal load of the power tool is calculated as follows:

$$I_D = I_B - I_G \quad (1)$$

By means of the invention, when and/or before a thermal limit is reached, it is possible to initiate a countermeasure, for example a switching-off of the tool. In this case, the current is evaluated with its thermal equivalent. This makes it possible to use miniaturized and/or favorable components even if they are not able to withstand the (short circuit) currents that are actually possible. This makes it possible in particular for the difference to only be calculated if the operating current exceeds the stored current value. This minimizes the amount of calculation effort required. The execution of the proposed method has only minimal—if any—effects on the operation of the hand-guided power tool. In particular, the stored current value can be permanently stored in the hardware of the hand-guided power tool.

The stored current value is advantageously less than or equal to a maximum continuous current. The expression "maximum continuous current" is understood to mean the current at which the tool can be operated continuously without being damaged. Thus if a maximum continuous current of 15 A is selected, this means that an entire battery pack charge can be drained at a current level of 15 A. Thus an excess thermal load is thus only taken into consideration if the operating current exceeds this continuous current.

Preferably, the difference is continuously calculated and repeatedly compared to a system parameter of the hand-guided power tool. It is thus possible to take into account the fact that the occurrence of an overload situation depends on both the extent of the thermal overload, i.e. on the amount of the difference, and on the duration of this overload, i.e. how many measurements have demonstrated an excessive current. It is thus also possible to take into consideration the fact that an overload situation can arise due to a large overload occurring over a short time as well as due to a smaller overload occurring over a longer period of time. In this case, the countermeasure to prevent the thermal overload is initiated if the sum is greater than or equal to the system parameter. The calculation is carried out as follows using the system parameter z:

$$\Sigma I_D = z \qquad (2)$$

It is also preferable for the difference to be raised to the power of a system-dependent exponent before the addition is carried out. This yields the formula:

$$\Sigma (I_D)^n = z \qquad (3)$$

In this way, it is possible to take into account the fact that a large difference, i.e. a more powerful thermal load, is more heavily weighted than a small difference. This makes it possible to obtain a better depiction of the actual conditions of the thermal load.

It is also preferable for the system parameter to be multiplied by a factor for the comparison. It is possible for the number of measurements per unit of time, for example, to be taken into account in this factor. With measurements occurring in quick succession, it is possible to tolerate a larger number of high currents measured than when the measurements take place only occasionally since with a larger number of measurements, a smaller amount of energy is conducted through per unit of time, even for the time interval of each measurement. When taking into account the system-dependent exponent n, this then yields the corresponding formula:

$$\Sigma (I_D)^n = z \cdot m \qquad (4)$$

In a modification of the invention, the sum is set to zero at the moment that the hand-guided power tool is switched on.

Advantageously, the operating current is reduced or interrupted as a countermeasure to prevent the thermal overload. This countermeasure makes it possible to combat an overload situation in a simple manner.

It is also preferable for the association of the set point duration and/or the determination of the system parameter to take into account an operating temperature of the hand-guided power tool, particularly at the moment that it is switched on. Here, too, it should be noted that the expression "an operating temperature of the hand-guided power tool" is understood not to mean a temperature of the tool as a whole, but a temperature of one or more critical components of the tool. Such a temperature at the moment that the tool is switched on can in particular be measured by means of a temperature-dependent resistance in order to thus obtain an input value for the calculation of the permissible limit per switching-on procedure. The resistance here functions more or less as a memory of the thermal history so that it is possible to prevent thermal destruction even with repeated switching on and off in the jammed state. In order to illustrate this, the system parameter can be represented as $z(T_0)$. The closer the temperature $T_0$ of the at least one critical component already is to its maximum temperature, particularly at the moment that the hand-guided power tool is switched on, the smaller $z(T_0)$ is. Thus $z(T_0)$ can also be represented as the product of a tool-dependent basic parameter $z_S$ and a temperature compensation $z_T(T_0)$:

$$z(T_0) = z_S \cdot z_T(T_0) \qquad (4)$$

$z_T(T_0)$ is equal to zero when the critical component has already reached its maximum permissible temperature or is, for example, 5° C. below the maximum permissible temperature. $z_T(T_0)$ is equal to one when the temperature is at the level at which $z_S$ was defined. If the temperature of the critical component is between the above-mentioned temperature level and the maximum permissible temperature, then $z_T(T_0)$ is selected to be between zero and one.

According to a modification of the invention, the thermal overload is associated with a maximum set point duration:

$$t_a = z/(I_D)^n \qquad (5)$$

In this case, z is a system parameter that depends on the design and type of hand-guided power tool and n is a system-dependent exponent, in particular where $1 = n = 3$. The system-dependent exponent n here is selected in accordance with the actual conditions. The exponent n represents the thermal characteristics of the critical component. The more strongly an exceeding of the stored current value is symptomatic of a thermal overload of the hand-guided power tool, the higher this exponent is selected to be. In particular, it is possible for z and n to be experimentally estimated. For the critical component, measurements are carried out, which determine how much time it will take for the component to reach its maximum permissible temperature and at what constant level of current. Based on distinct measurement points, in particular three measurement points, it is then possible to estimate or calculate the parameters n (for example 3) and z (for example 4096 s$A^n$).

The association of thermal overload and set point duration is advantageously stored in the form of a characteristic curve. This permits a particularly flexible processing. It should be noted that the characteristic curve does not explicitly have to be stored in the form of values or a value table, but can also be defined with specific parameters in conjunction with a mathematical function.

According to a modification of the invention, the characteristic curve is hyperbola-shaped. The applicant has come to the conclusion that such a characteristic curve is particularly well-suited to the above-mentioned association.

The invention also relates to a monitoring device for detecting an overload situation in a power tool equipped with an electric motor, particularly a battery-powered hand-guided power tool, which monitoring device has a current measuring device that determines an operating current of the electric motor; the monitoring device also has a logic device that calculates a difference between the operating current and at least one stored current value and based on the result, determines whether a thermal overload is occurring. The logic device is in particular embodied in the form of a digital controller.

DRAWINGS

The invention will be explained in greater detail below in conjunction with exemplary embodiments.

DESCRIPTION OF THE PREFERRED EMBODIMENTS

Figure 1:
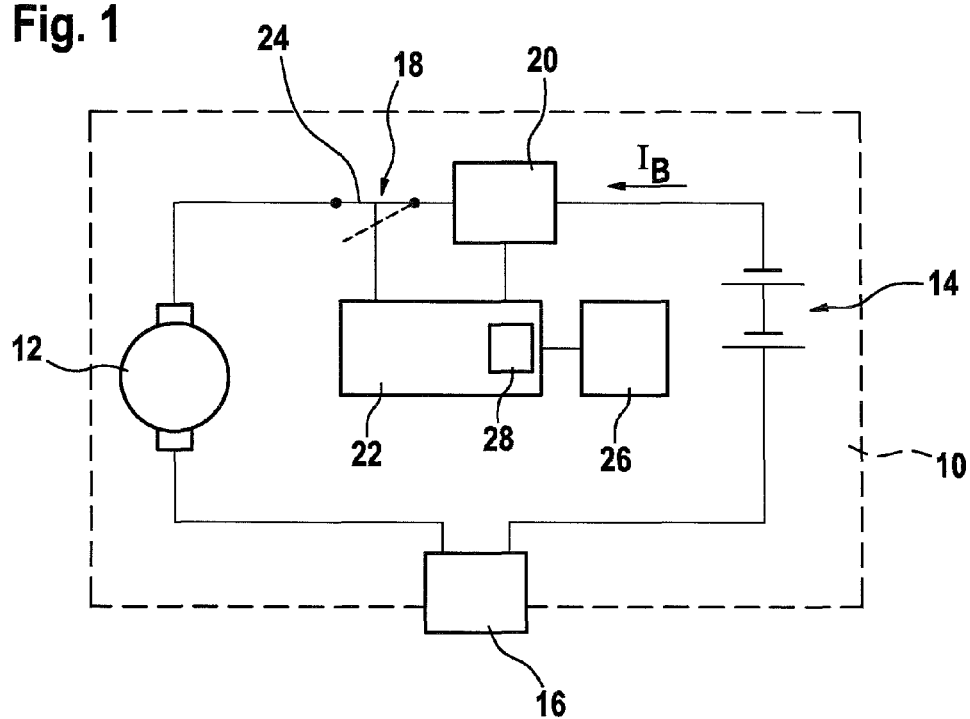
FIG. 1 shows a symbolically depicted exemplary embodiment of a hand-guided power tool equipped with a monitoring device and FIG. 2 shows an exemplary embodiment of a functional relationship for the thermal overload and the maximum set point duration.

FIG. 1 shows a hand-guided power tool 10 equipped with an electric motor 12; the hand-guided power tool 10 is powered by a rechargeable battery pack 14. Starting from the battery pack 14, the circuit includes a control 16, the electric motor 12, a circuit breaking device 18, and a current measuring device 20. A monitoring device 22 triggers the circuit breaking device 18. The circuit breaking device 18 has a switch 24 (which can also be embodied in the form of a semiconductor component), which as a rule is closed, but can be opened as needed by the monitoring device 22. The open position of the switch 24 is depicted with dashed lines. Finally, the battery pack 14 is associated with a temperature measuring device 26 that detects the temperature of the battery pack 14. At least one current value is stored in the monitoring device 22, in this case being permanently stored in the hardware.

At the moment that the hand-guided power tool 10 is switched on, the above-mentioned sum $\Sigma(I_D)^n$ is initially set equal to zero. During normal operation, the user controls the hand-guided power tool 10 by means of a control 16 that influences the power output from the battery pack 14 to the electric motor 12 (this procedure is known from the prior art and is therefore only schematically depicted). During operation, the current measuring device 20 repeatedly measures the operating current $I_B$. If a situation arises in which the operating current $I_B$ exceeds the stored current value $I_G$, then this increases the sum of the previously mentioned formula (4). In this case, $z(T_0)$ is used as a system parameter, the temperature $T_0$ at the moment that the tool is switched on having been determined by the temperature measuring device 26. During this overload situation, the sum increases steadily and is repeatedly compared to the value $z \cdot m$. If the sum exceeds this value, then a signal from the monitoring unit 22 causes the circuit breaking device 18 to break the circuit. The hand-guided power tool 10—in this instance, the critical component in the form of the battery pack 14—is thus protected from a thermal damage and a thermal failure.

Alternatively, as described above, it is also possible for a multitude of measurements to be carried out, in particular more than 100 measurements per second. The system parameter $z(T_0)$ is then multiplied, for example, by the number of measurements per second in order to thus take into account the high number of measurements and thus a reduced influence of an individual measurement.

Figure 2:
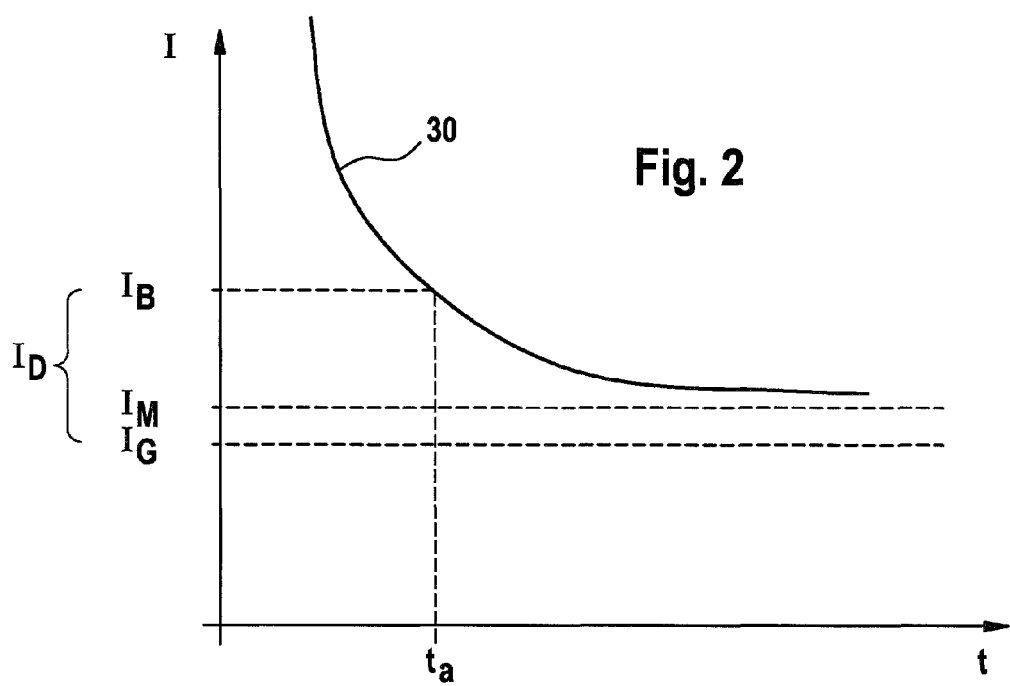

FIG. 2 shows the progression of a sample characteristic curve 30 that has been experimentally determined and used for determining the parameters z and n. In it, the time t for the set point duration $t_a$ is plotted along the abscissa and the current I for the current $I_B$ flowing in the circuit is plotted along the ordinate. The at least one stored current value $I_G$ and the maximum continuous current $I_M$ are shown for orientation purposes. It is clear in this case that it is possible to determine a corresponding maximum set point duration $t_a$ for a measured operating current $I_B$. It is clear from the graph that the proposed method tolerates power surges because even currents that exceed the stored current value $I_G$ by a large amount are permitted at least for a short time. On the other hand, it is also clear that currents that exceed the stored current value $I_G$ by a small amount are associated with a long set point duration $t_a$. This prevents currents that exceed the limit value by a small amount from triggering a premature switching-off.

What is claimed is:

1. A method for detecting an overload situation in a battery-powered hand-guided power tool (10) equipped with an electric motor (12) and a DC battery pack (14) for supplying an operating current ($I_B$) to the electric motor (12), in particular for a battery-powered hand-guided power tool (10), in which the operating current ($I_B$) of the electric motor (12) is determined, wherein a difference ($I_D$) between the value of the operating current ($I_B$) and at least one stored current value ($I_G$) is determined, in association with a maximum set point duration ($t_a$), which maximum set point duration ($t_a$) defines a maximum duration of said overload situation by taking into account an operating temperature ($T_0$) of the hand-guided power tool (10), particularly at a moment at which the tool is switched on, and based on the difference ($I_D$), a conclusion is drawn as to whether a thermal overloading of the power tool (10) is occurring.

2. The method as recited in claim 1, wherein the stored current value ($I_G$) is less than or equal to a maximum continuous current ($I_M$).

3. The method as recited in claim 1, wherein the difference ($I_D$) is continuously calculated and repeatedly compared to a system parameter (z) of the hand-guided power tool.

4. The method as recited in claim 3, wherein the difference ($I_D$) is raised to the power of a system-dependent exponent (n) before the addition is carried out.

5. The method as recited in claim 3, wherein the system parameter (z) is multiplied by a factor for the comparison.

6. The method as recited in claim 3, wherein the sum is set to zero at the moment that the hand-guided power tool is switched on.

7. The method as recited in claim 3, wherein a determination of the system parameter (z) takes into account an operating temperature ($T_0$) of the hand-guided power tool (10), particularly at the moment that it is switched on.

8. The method as recited in claim 1, wherein the operating current ($I_B$) is reduced or interrupted as a countermeasure to prevent the thermal overload.

9. The method as recited in claim 1, wherein the association of the thermal overload and the maximum set point duration ($t_a$) are stored in the form of a characteristic curve (30).

10. The method as recited in claim 9, wherein the characteristic curve (30) is hyperbola-shaped.

11. A monitoring device (22) for detecting an overload situation in a battery-powered hand-guided power tool (10) equipped with an electric motor (12) and a DC battery pack (14) for supplying an operating current ($I_B$) to the electric motor (12), particularly a battery-powered hand-guided power tool (10), which monitoring device (22) has a current measuring device (20) that determines the operating current ($I_B$) of the electric motor (12), wherein the monitoring device (22) also has a logic device (28) that calculates a difference ($I_D$) between the operating current ($I_B$) and at least one stored current value ($I_G$), in association with a maximum set point duration ($t_a$), which maximum set point duration ($t_a$) defines a maximum duration of said overload situation by taking into account an operating temperature ($T_0$) of the hand-guided power tool (10), particularly at a moment at which the tool is switched on, and based on the resulting difference ($I_D$), determines whether a thermal overload is occurring.

12. The monitoring device as recited in claim 11, wherein the logic device (24) is embodied in the form of a digital controller.

13. A method for detecting an overload situation in a battery-powered hand-guided power tool (10) equipped with an electric motor (12) and a DC battery pack (14) for supplying an operating current ($I_B$) to the electric motor (12), in particular for a battery-powered hand-guided power tool (10), in which the operating current ($I_B$) of the electric motor (12) is determined, wherein a difference ($I_D$) between the value of the operating current ($I_B$) and at least one stored current value ($I_G$) is determined and based on this difference ($I_D$), a conclusion is drawn as to whether a thermal overloading of the power tool (10) is occurring, which thermal overloading is associated with a maximum set point duration ($t_a$), and wherein the association of thermal overloading and the maximum set point duration ($t_a$) is stored in the form of a characteristic curve (30).

14. The method as recited in claim 13, wherein the stored current value ($I_G$) is less than or equal to a maximum continuous current ($I_M$).

15. The method as recited in claim 13, wherein the difference ($I_D$) is continuously calculated and repeatedly compared to a system parameter (z) of the hand-guided power tool.

16. The method as recited in claim 15, wherein the difference ($I_D$) is raised to the power of a system-dependent exponent (n) before the addition is carried out.

17. The method as recited in claim 15, wherein the system parameter (z) is multiplied by a factor for the comparison.

18. The method as recited in claim 15, wherein the sum is set to zero at the moment that the hand-guided power tool is switched on.

19. The method as recited in claim 15, wherein a determination of the system parameter (z) takes into account an operating temperature ($T_0$) of the hand-guided power tool (10), particularly at the moment that it is switched on.

20. The method as recited in claim 13, wherein the operating current ($I_B$) is reduced or interrupted as a countermeasure to prevent the thermal overload.

21. The method as recited in claim 13, wherein the association of the thermal overload and the maximum set point duration ($t_a$) are stored in the form of a characteristic curve (30).

22. The method as recited in claim 21, wherein the characteristic curve (30) is hyperbola-shaped.

23. A monitoring device (22) for detecting an overload situation in a battery-powered hand-guided power tool (10) equipped with an electric motor (12) and a DC battery pack (14) for supplying an operating current ($I_B$) to the electric motor (12), particularly a battery-powered hand-guided power tool (10), which monitoring device (22) has a current measuring device (20) that determines the operating current ($I_B$) of the electric motor (12), wherein the monitoring device (22) also has a logic device (28) that calculates a difference ($I_D$) between the operating current ($I_B$) and at least one stored current value ($I_G$) and based on the result, determines whether a thermal overload is occurring, which thermal overload is associated with a maximum set point duration ($t_a$), and wherein the association of thermal overload and the maximum set point duration ($t_a$) is stored in the form of a characteristic curve (30).

* * * * *